US006971448B2

(12) United States Patent
Slabaugh et al.

(10) Patent No.: US 6,971,448 B2
(45) Date of Patent: Dec. 6, 2005

(54) METHODS AND COMPOSITIONS FOR SEALING SUBTERRANEAN ZONES

(75) Inventors: Billy F. Slabaugh, Duncan, OK (US); Jimmie D. Weaver, Duncan, OK (US); Trinidad Munoz, Jr., Duncan, OK (US); Bradley L. Todd, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 213 days.

(21) Appl. No.: 10/376,182

(22) Filed: Feb. 26, 2003

(65) Prior Publication Data

US 2004/0163813 A1 Aug. 26, 2004

(51) Int. Cl.[7] .............................................. E21B 33/138

(52) U.S. Cl. ........................................ 166/294; 166/300

(58) Field of Search ......................... 166/285, 292–295, 166/300

(56) References Cited

U.S. PATENT DOCUMENTS

| | | | | |
|---|---|---|---|---|
| 3,728,331 A | | 4/1973 | Savage | 260/231 |
| 3,794,115 A | | 2/1974 | Skagerberg | 166/294 |
| 4,568,481 A | | 2/1986 | Harris, Jr. | 252/315.3 |
| 4,753,659 A | | 6/1988 | Bayerlein et al. | 8/561 |
| 4,766,959 A | | 8/1988 | Allison | 166/295 |
| 4,828,726 A | | 5/1989 | Himes et al. | 252/8.553 |
| 4,874,854 A | | 10/1989 | Colegrove et al. | 536/114 |
| 4,974,678 A | | 12/1990 | Himes et al. | 166/308 |
| 4,977,962 A | | 12/1990 | Himes et al. | 166/305.1 |
| 5,097,904 A | | 3/1992 | Himes | 166/294 |
| 5,184,680 A | | 2/1993 | Totten et al. | 166/293 |
| 5,197,544 A | | 3/1993 | Himes | 166/294 |
| 5,273,580 A | * | 12/1993 | Totten et al. | 106/724 |
| 5,330,005 A | | 7/1994 | Card et al. | 166/280 |
| 5,439,055 A | | 8/1995 | Card et al. | 166/280 |
| 5,501,275 A | | 3/1996 | Card et al. | 166/280 |
| 5,708,162 A | | 1/1998 | Hilbig et al. | 536/124 |
| 5,775,425 A | | 7/1998 | Weaver et al. | 166/276 |
| 5,787,986 A | | 8/1998 | Weaver et al. | 166/280 |
| 5,833,000 A | | 11/1998 | Weaver et al. | 166/276 |
| 5,839,510 A | | 11/1998 | Weaver et al. | 166/276 |
| 5,853,048 A | | 12/1998 | Weaver et al. | 166/279 |
| 5,871,049 A | | 2/1999 | Weaver et al. | 166/276 |
| 6,047,772 A | | 4/2000 | Weaver et al. | 166/276 |
| 6,488,091 B1 | * | 12/2002 | Weaver et al. | 166/300 |

FOREIGN PATENT DOCUMENTS

| | | | |
|---|---|---|---|
| EP | 0 030 443 A1 | 2/1980 | C08B/37/14 |
| EP | 1 267 034 A2 | 6/2002 | E21B/43/26 |
| WO | WO 93/15116 | 8/1993 | C08B/37/00 |
| WO | WO 03/001030 | 1/2003 | E21B/43/26 |

OTHER PUBLICATIONS

Craig, David et al (1992) Proceedings of the Thirty–Ninth Annual Southwestern Petroleum Short Course, Southwestern Petroleum Short Course Association, Inc., entitled "The Degradatio of Hydroxypropyl Guar Fracturing Fluids by Enzyme, Oxidative, and Gatalyzed Oxidative Breakers" Apr. 22–23, 1992, Texas Tech University, Lubbock, Texas.

Frollini, E. et al (1995) Carbohydrate Polymers 27; pp 129–135 entitled "Polyelectrolytes from Polysaccharides: Selective Oxidation of Guar Gum—a Revisited Reaction".

Vijayendran and Bone (1984) Carbohydrate Polymers 4; pp 299–313 entitled "Absolute Molecular Weight and Molecular Weight Distribution of Guar by Size Exclusion Chromatography and Low–Angle Laser Light Scattering".

Ouchi, T. et al (1997) J.M.S.—Pure Appl. Chem. A34 (6), pp. 975–989 entitled "Synthesis and Cytotoxic Activity of Oxidized Galactomannan/ADR Conjugate".

Tayal, Akash, et al (2000) Marcromolecules 33, 9488–9493 entitled "Degradation of a Water Soluble Polymer: Molecular Weight Changes and Chain Scission Characteristics".

Foreign communication from a related counterpart application dated Mar. 18, 2004.

* cited by examiner

*Primary Examiner*—Zakiya Walker
(74) *Attorney, Agent, or Firm*—Robert A. Kent; C. Clark Dougherty, Jr.

(57) ABSTRACT

Methods and compositions for sealing subterranean zones having temperatures in the range of from about 80° F. to about 300° F. are provided. A method of the invention is basically comprised of the steps of providing a subterranean zone sealing composition that becomes substantially rigid when exposed to subterranean zone temperatures above about 80° F. and has a pH above about 8.5 comprised of water, a substantially fully hydrated depolymerized polymer and a cross-linking agent. The sealing composition is introduced into the subterranean zone whereby it becomes rigid and seals the zone. The sealing composition can subsequently be removed by contact with a fluid having a pH below about 8 when a boron compound is utilized as the cross-linking agent.

21 Claims, No Drawings

METHODS AND COMPOSITIONS FOR SEALING SUBTERRANEAN ZONES

BACKGROUND OF THE INVENTION

1. Field of the Invention

The present invention relates to methods and compositions for sealing subterranean zones.

2. Description of the Prior Art

In the drilling of oil and gas wells using the rotary drilling method, drilling fluid is circulated through the drill string and drill bit and then back to the surface by way of the well bore being drilled. The drilling fluid maintains hydrostatic pressure on the subterranean zones through which the well bore is drilled and circulates cuttings out of the well bore. During such drilling, subterranean vugs, fractures and other thief zones are often encountered whereby the drilling fluid circulation is lost and drilling operations must be terminated while remedial steps are taken.

Heretofore, a variety of sealing compositions have been developed and used for combating loss circulation. However, such sealing compositions have often been unsuccessful due to overly delayed and inadequate viscosity development. The delay in developing viscosity allows the sealing composition to be diluted and displaced into subterranean producing zones into or near the lost circulation zone thereby damaging them. Also, the heretofore utilized sealing compositions have been difficult or impossible to remove from the subterranean producing zones into which they have penetrated. In order to prevent damage to a producing zone in or near a lost circulation zone, the producing zone should be sealed with a sealing composition that can subsequently be removed to prevent drilling fluid damage to the producing zone.

Thus, there are needs for improved methods and compositions for sealing subterranean zones that can be readily and substantially completely removed from the zones.

SUMMARY OF THE INVENTION

Improved subterranean zone sealing methods and compositions are provided by the present invention which overcome the deficiencies of the prior art and meet the needs described above. A method of this invention for sealing a subterranean zone having a temperature in the range from about 80° F. to about 300° F. to prevent the uncontrolled flow of fluids into the zone is comprised of the following steps. A subterranean zone sealing composition that becomes substantially rigid when exposed to subterranean zone temperatures above about 80° F. and has a pH above about 8.5 is provided comprised of water, a substantially fully hydrated depolymerized polymer and a cross-linking agent for the polymer. The sealing composition is introduced into the subterranean zone wherein it becomes substantially rigid and seals the zone. When it is desirable to remove the sealing composition from the subterranean zone, the sealing composition is contacted with a fluid having a pH below about 8 when a boron compound is used as the cross-linking agent to break the sealing composition.

The subterranean zone sealing compositions that become substantially rigid when exposed to subterranean zone temperatures above about 80° F., that have a pH above about 8.5 and that can be removed by contact with a fluid having a pH below about 8 are basically comprised of water, a substantially fully hydrated depolymerized polymer and a cross-linking agent comprising a boron compound.

When a sealing composition of this invention is contacted with a fluid having a low pH, the cross-links of the sealing composition are broken. The hydrated depolymerized polymer remaining is of small molecular size, is readily resolubilized and flows out of the subterranean zone with produced fluids.

The features and advantages of the present invention will be readily apparent to those skilled in the art upon a reading of the description of preferred embodiments which follows.

DESCRIPTION OF PREFERRED EMBODIMENTS

The present invention provides improved methods and sealing compositions for sealing a subterranean zone having a temperature in the range of from about 80° F. to about 300° F. to prevent the uncontrolled flow of fluids into the zone. A method of this invention is comprised of the following steps. A subterranean zone sealing composition is provided that becomes substantially rigid when exposed to subterranean zone temperatures above about 80° F. and has a pH above about 8.5. The sealing composition is basically comprised of water, a substantially fully hydrated depolymerized polymer and a cross-linking agent for the polymer. The sealing composition is introduced into the subterranean zone to be sealed wherein it becomes substantially rigid and seals the zone. When it is desired to remove the sealing composition from the subterranean zone, the sealing composition is contacted with a fluid having a pH below about 8 when a boron source is used as the cross-linking agent. Conventional oxidizers and enzymes may be used with other cross-linkers.

The water utilized in the sealing composition of this invention is selected from the group consisting of fresh water and salt water. The term "salt water" is used herein to mean unsaturated salt water and saturated salt water including brines and seawater. The water utilized is included in the sealing composition in an amount in the range of from about 98% to about 99.5% by weight of the sealing composition.

The substantially fully hydrated depolymerized polymers which are useful in accordance with this invention are substantially fully hydrated depolymerized guar or cellulose derivative polymers. Such substantially fully hydrated depolymerized polymers may be manufactured using derivatization and depolymerization techniques known in the art or as described in U.S. patent application Ser. No. 60/297,345 entitled "Galactomannan Compositions And Methods For Making And Using The Same" filed on Jun. 11, 2001 by Jesse Magallanes, Sylvain Diguet and William Stivers, or U.S. Pat. No. 6,488,091, the entire disclosures of which are incorporated herein by reference. In a preferred embodiment, the depolymerized polymer is prepared by adding the polymer to be depolymerized to a reaction vessel together with a quantity of hydrogen peroxide and water. The reactor vessel is heated to an elevated temperature such as about 100° F. to initiate the reaction if the ambient temperature is insufficient to initiate the reaction. Once initiated the depolymerization reaction is exothermic and the temperature of the reactor vessel generally should be maintained in the range of from about 100° F. to 200° F. for a sufficient time for the polymer to degrade to the desired molecular weight. Alternatively, the polymer may be formed from lower molecular weight monomers that are polymerized until the desired molecular weight is achieved. The hydratable polymer utilized for forming the short chained segments can be substantially any polysaccharide and is preferably a guar or cellulose derivative polymer selected from the group consisting of hydroxypropylguar, carboxymethylhydroxypropylguar, carboxymethyl-guar, hydroxyethylguar, carboxymethylhydroxyethylguar, hydroxyethylcellulose, hydroxyethylcellulose grafted with glycidol or vinyl phosphonic acid, carboxymethylcellulose and carboxymethylhydroxyethylcellulose. Of these, depolymerized hydroxypropylguar is preferred. The depolymerized polymer should have an average molecular weight in the range of from about 25,000 to about 400,000 and preferably has an average molecular weight in the range of from about 100,000 to about 250,000. The depolymerized polymer preferably should have a polydispersity ratio of from 1 to about 12 as determined by gel permeation chromatography as disclosed in "PRACTICAL HIGH PERFORMANCE LIQUID CHROMATOGRAPHY" edited by C. F. Simpson (Hyden & Son Ltd., 1976). The polydispersity ratio of polysaccharides or other polymers generally can range from about 2 to as much as 250. The depolymerized polymer of the present invention has been found to exhibit the superior properties identified herein when maintained within the indicated polydispersity ratio. The depolymerized polymer is hydrated to form a depolymerized fluid concentrate. If desired for purposes of transportation, storage or otherwise, the depolymerized polymer may be stored in dry form and, when needed, may be hydrated to form the treating fluid concentrate. The substantially fully hydrated depolymerized polymer concentrate may be admixed with water whereby the polymer is present in an amount of about 6% to an excess of about 30% by weight and most preferably from about 6% to about 11% by weight of the concentrate. The viscosity of the treating fluid concentrate may generally be in the range of from about 15,000 to an excess of about 35,000 centipoises as determined using a Brookfield DV II plus RV spring viscometer manufactured by Brookfield Engineering Laboratories of Middleboro, Mass. The viscosity is determined by measurements performed at a temperature of about 75° F. and a rotational speed of 20 rpm using an LV3 Bob. Other similar instruments can also be used to measure the viscosity of the fluid concentrate.

The water utilized to form the treating fluid concentrate can be fresh water or salt water including sodium chloride or potassium chloride in an amount in the range of from about 13% to about 20% by weight of the water, but not including divalent salts. Generally the substantially fully hydrated depolymerized polymer utilized in the present invention is mixed with the water in an amount in the range of from about 6% to about 30% by weight of the water.

A variety of additives can be included in the concentrate of this invention at the time of its manufacture. Such additives generally include pH adjusting compounds for adjusting the pH of the treating fluid to an optimum or desired pH for cross-linking when it is formed with the concentrate. Examples of such compounds which can be utilized include, but are not limited to, sodium hydroxide, lithium hydroxide, fumaric acid, formic acid, acidic acid, acidic anhydride and hydrochloric acid. When used, the pH adjusting compound is included in the concentrate in an amount in the range of from about 0.05% to about 5% by weight of the water therein.

A pH buffer can also be included in the concentrate. Examples of buffers which can be used include, but are not limited to, sodium carbonate, sodium bicarbonate, potassium bicarbonate, sodium diacetate, potassium diacetate, sodium phosphate, potassium phosphate, sodium dihydrogen phosphate and potassium dihydrogen phosphate. When used, the buffer is included in the concentrate in an amount in the range of from about 0.05% to about 15% by weight of the water therein.

Another additive which can be included in the concentrate is a surfactant for preventing the formation of emulsions between the sealing composition and subterranean formation fluids. Examples of surfactants which can be used include, but are not limited to, alkyl sulfonates, alkyl aryl sulfonates, dodecylbenzene sulfonic acid, alkyl trimethylammonium chloride, branched alkyl ethoxylated alcohols, phenol-formaldehyde non-ionic resin blends, cocobetaines, dioctyl sodium sulfosuccinate, imidazolines, alpha olefin sulfonates, linear alkyl ethoxylated alcohols and trialkyl benzyl ammonium chloride. Of these, dodecylbenzene sulfonic acids are preferred. When used, the surfactant is included in the concentrate in an amount in the range of from about 0.01% to about 1% by weight of the water therein.

Yet another additive which can be included in the concentrate is a clay stabilizer. Examples of clay stabilizers which can be used include, but are not limited to, potassium chloride, sodium chloride, ammonium chloride and tetramethylammonium chloride. Of these, potassium chloride and tetramethylammonium chloride are preferred. When used, the clay stabilizer is included in the concentrate in an amount in the range of from about 2% to about 20% by weight of water therein.

When the concentrate containing the substantially fully hydrated depolymerized polymer is mixed with additional water, if necessary, to form the sealing composition of this invention, no hydration time is required since the concentrate is already substantially fully hydrated. The additional water can be mixed with the concentrate in a water to concentrate ratio in the range of from about 4:1 to about 20:1. Generally, additional water is added to the concentrate whereby the water is present in the sealing composition in an amount in the range of from about 97% to about 99% by weight of the composition.

The substantially fully hydrated depolymerized polymer utilized in accordance with this invention is preferably a substantially fully hydrated depolymerized guar or cellulose derivative polymer. Examples of such polymers include, but are not limited to, hydroxypropylguar, carboxymethylhydroxypropylguar, carboxymethylguar, hydroxyethylguar, carboxymethylhydroxyethylguar, hydroxyethylcellulose, grafted hydroxyethylcellulose, carboxymethylcellulose and carboxymethylhydroxyethylcellulose. Of these, a substantially fully hydrated depolymerized hydroxypropylguar is preferred. The substantially fully hydrated depolymerized polymer is present in the sealing composition in an amount in the range of from about 0.5% to about 2% by weight of the composition.

The cross-linking agent included in the sealing composition cross-links the substantially fully hydrated depolymerized polymer in the sealing composition increasing its viscosity and causes the sealing composition to be become substantially rigid at subterranean zone temperatures in the range of from about 80° F. to about 300° F. Examples of cross-linking agents which can be utilized in accordance with this invention include, but are not limited to, boron compounds, compounds that supply zirconium IV ions, compounds that supply titanium IV ions, aluminum compounds, compounds that supply antimony compounds, dehydrated boric acid and dehydrated sodium tetraborate. While the cross-linking agent utilized can be encapsulated to delay the sealing composition from becoming highly viscous until it is placed in the subterranean zone to be sealed, dehydrated boric acid and dehydrated sodium tetraborate are relatively slow in cross-linking the sealing composition without being encapsulated. Generally, the dehydrated boric acid or sodium tetraborate have cross-linking times in the range of from about 6 to 30 minutes. Of the various cross-linking agents that can be utilized, dehydrated sodium tetraborate is preferred. The cross-linking agent utilized is generally present in the sealing composition in an amount in the range of from about 0.025% to about 0.1% by weight of the composition.

As mentioned above, after the sealing composition of this invention has been introduced into a subterranean zone to be sealed and forms a substantially rigid sealing mass therein, the rigid sealing composition can be removed from the subterranean zone by contacting the sealing composition with a fluid having a pH below about 8 when the cross-linking agent is a source of boron. At such a pH, the rigid sealing composition uncross-links and breaks up. Because the depolymerized uncross-linked polymer molecules are of a small size they are easily resolubilized by well bore fluids and readily flow out of the subterranean zone. This is contrasted with prior art sealing polymers which form filter cakes and insoluble skins that control fluid loss but are very difficult to remove. When the other metal ion cross-linkers are utilized, any of the conventionally used delayed breakers employed with metal ion cross-linkers can be utilized, for example, oxidizers such as sodium chlorite, sodium bromate, sodium persulfate, potassium persulfate, ammonium persulfate, encapsulated sodium persulfate, potassium persulfate or ammonium persulfate and the like as well as magnesium peroxide. Enzyme breakers that may be employed include alpha and beta amylases, amyloglucosidase, invertase, maltase, cellulase and hemicellulase. The specific breaker employed, whether or not it is encapsulated, as well as the amount thereof employed will depend upon the breaking time desired, the nature of the polymer and cross-linking agent, formation characteristics and conditions and other factors.

A preferred method of this invention for sealing a subterranean zone having a temperature in the range of from about 80° F. to about 300° F. to prevent the uncontrolled flow of fluids into the zone is comprised of the steps of: (a) providing a subterranean zone sealing composition that becomes substantially rigid when exposed to subterranean zone temperatures above about 80° F. and has a pH above about 8.5 comprising water, a substantially fully hydrated depolymerized polymer and a cross-linking agent for the polymer; and (b) introducing the sealing composition into the subterranean zone wherein it becomes substantially rigid and seals the zone.

The rigid sealing composition formed as described above can be removed from the subterranean zone by contacting the rigid sealing composition with a fluid having a pH below about 8 when the cross-linking agent is a boron compound.

A preferred subterranean zone sealing composition of this invention that becomes substantially rigid when exposed to subterranean zone temperatures above about 80° F., that has a pH above about 8.5 and that can be removed by contact with a fluid having a pH below about 8 is comprised of: water; a substantially fully hydrated depolymerized polymer; and a cross-linking agent comprising a boron compound.

The sealing composition can optionally include a pH adjusting compound, a pH buffer, a surfactant to prevent emulsions, a clay stabilizer and other conventional additives.

Thus, the present invention is well adapted to carry out the objects and attain the benefits and advantages mentioned as well as those which are inherent therein. While numerous changes to the compositions and methods can be made by those skilled in the art, such changes are encompassed within the spirit of this invention as defined by the appended claims.

The following example is provided to further illustrate the benefits of the present invention.

EXAMPLE

An extrusion test to evaluate the rigidity of a sealing composition was performed on the composition of the present invention and a commercially available sealant. The test apparatus comprised a Fann Instruments model HPHT test cell having full opening valves on the inlet and exit ports. The bottom end cap of the HPHT cell has circumferential grooves to permit flow through a core sample to communicate with the exit port. A ¼ inch thick water saturated ALOXITE disk, a product of Fann Instrument Company, having a 20 micron pore throat is fixed in the bottom of the test cell on top of the bottom end cap. The cell is mounted vertically and filled with the test fluid. The fluid is allowed to age for 2 hours in the test cell at about 80° F. and a 400 psi nitrogen gas source is connected to the inlet port of the HPHT cell. To begin the test, both valves are opened simultaneously and the 400 psi nitrogen gas pressure is applied to the fluid in the cell. The time is monitored and any fluid caused to be extruded through the ALOXITE disk is collected and measured. Each test is run in duplicate and the results are averaged for a final value. The time and volume of fluid extruded is set forth in Tables 1 and 2 below. The commercially available sealant utilized in the test comprised a 120 pound/ 1000 gallon crosslinked vinyl grafted hydroxyethyl cellulose prepared in a 2% calcium chloride brine. The composition of the present invention utilized in the test comprised a 2% by volume solution of hydrated depolymerized hydroxypropyl guar cross-linked with a borate cross-linker. The results of the test are set forth below. A material exhibiting an extrusion of less than 20 ml over the duration of the test is considered to be an acceptable sealant and the lower the amount of extruded fluid the more rigid is the sealant to displacement.

TABLE 1

Commercially available Sealant

| Time, | Volume extruded, ml | | |
|---|---|---|---|
| seconds | Test 1 | Test2 | Average, ml |
| 6 | 10 | 11.5 | 10.7 |
| 60 | 13 | 13 | 13 |
| 120 | 14 | 13.5 | 13.7 |
| 240 | 14 | 14 | 14 |
| 480 | 14.5 | 15 | 14.7 |

TABLE 2

Sealant composition of present invention

| Time, | Volume extruded, ml | | |
|---|---|---|---|
| seconds | Test 1 | Test2 | Average, ml |
| 6 | 9.3 | 5.1 | 7.2 |
| 60 | 10.4 | 5.3 | 7.9 |
| 120 | 10.9 | 5.6 | 8.3 |
| 240 | 11.4 | 6.0 | 8.7 |
| 360 | 11.8 | 6.3 | 9.1 |
| 480 | 12.2 | 6.4 | 9.3 |

The data clearly illustrates the improved performance of the composition of the present invention in resisting extrusion through a simulated formation material over a conventionally available sealant.

What is claimed is:

1. A method of sealing a subterranean zone having a temperature above about 80° F. to prevent the uncontrolled flow of fluids into the zone comprising the steps of:

(a) providing a subterranean zone sealing composition that becomes rigid when exposed to subterranean zone temperatures in the range of from about 80° F. to about 300° F. and has a pH above about 8.5 comprising water, a substantially fully hydrated depolymerized polymer and a cross-linking agent for said polymer; and (b) introducing said sealing composition into said subterranean zone wherein it becomes substantially rigid and seals said zone.

2. The method of claim 1 wherein said water is selected from the group consisting of fresh water and salt water.

3. The method of claim 1 wherein said water is present in said sealing composition in an amount in the range of from about 97% to about 99% by weight of said composition.

4. The method of claim 1 wherein said substantially fully hydrated depolymerized polymer is a substantially fully hydrated depolymerized guar or cellulose derivative polymer selected from the group consisting of hydroxypropylguar, carboxymethylhydroxypropylguar, carboxymethylguar, hydroxyethylguar, carboxymethylhydroxyethylguar, hydroxyethylcellulose, grafted hydroxyethylcellulose, carboxymethylcellulose and carboxymethylhydroxyethylcellulose.

5. The method of claim 1 wherein said substantially fully hydrated depolymerized polymer is substantially fully hydrated depolymerized hydroxypropylguar.

6. The method of claim 1 wherein said substantially fully hydrated depolymerized polymer is present in said sealing composition in an amount in the range of from about 0.5% to about 2% by weight of said composition.

7. The method of claim 1 wherein said cross-linking agent is selected from the group consisting of boron compounds, compounds that supply zirconium IV ions, compounds that supply titanium IV ions, aluminum compounds, compounds that supply antimony compounds, dehydrated boric acid and dehydrated sodium tetraborate.

8. The method of claim 1 wherein said cross-linking agent is dehydrated sodium tetraborate.

9. The method of claim 1 wherein said cross-linking agent is present in said sealing composition in an amount in the range of from about 0.025% to about 0.1% by weight of said composition.

10. The method of claim 1 wherein said sealing composition further comprises a pH adjusting compound.

11. The method of claim 10 wherein said pH adjusting compound is selected from the group consisting of sodium hydroxide, lithium hydroxide, fumaric acid, formic acid, acetic acid, acetic anhydride and hydrochloric acid.

12. The method of claim 1 wherein said sealing composition further comprises a buffer.

13. The method of claim 12 wherein said buffer is selected from the group consisting of sodium carbonate, sodium bicarbonate, potassium bicarbonate, sodium diacetate, potassium diacetate, sodium phosphate, potassium phosphate, sodium dihydrogen phosphate and potassium dihydrogen phosphate.

14. The method of claim 1 wherein said sealing composition further comprises a surfactant to prevent emulsions.

15. The method of claim 14 wherein said surfactant is selected from the group consisting of alkyl sulfonates, alkyl aryl sulfonates, dodecylbenzene sulfonic acid, alkyl trimethylammonium chloride, branched alkyl ethoxylated alcohols, phenol-formaldehyde non-ionic resin blends, cocobetaines, dioctyl sodium sulfosuccinate, imidazolines, alpha olefin sulfonates, linear alkyl ethoxylated alcohols and trialkyl benzylammonium chloride.

16. The method of claim 1 wherein said sealing composition further comprises a clay stabilizer.

17. The method of claim 16 wherein said clay stabilizer is selected from the group consisting of potassium chloride, sodium chloride, arnmonium chloride and tetramethyl ammonium chloride.

18. A method of sealing a subterranean zone having a temperature above about 80° F. to prevent the uncontrolled flow of fluids into the zone comprising the steps of:

(a) providing a subterranean zone sealing composition that becomes rigid when exposed to subterranean zone temperatures in the range of from about 80° F. to about 300° F. and has a pH above about 8.5 comprising water, a substantially fully hydrated depolymerized polymer and a cross-linking agent for said polymer comprising a boron compound;

(b) introducing said sealing composition into said subterranean zone wherein it becomes substantially rigid and seals said zone; and (c) removing said rigid sealing composition from said subterranean zone by contacting said sealing composition with a fluid having a pH below about 8.0.

19. The method of claim 18 wherein said boron compound comprises dehydrated boric acid or dehydrated sodium tetraborate.

20. The method of claim 18 wherein said boron compound is dehydrated sodium tetraborate.

21. The method of claim 18 wherein the boron compound is present in said sealing composition in an amount in the range of from about 0.025% to about 0.1% by weight of said sealing composition.

* * * * *